(12) United States Patent
Kannoo

(10) Patent No.: US 8,327,883 B2
(45) Date of Patent: Dec. 11, 2012

(54) MULTI-WAY SELECTOR VALVE

(75) Inventor: Takeshi Kannoo, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 347 days.

(21) Appl. No.: 12/805,408

(22) Filed: Jul. 29, 2010

(65) Prior Publication Data

US 2011/0048562 A1   Mar. 3, 2011

(30) Foreign Application Priority Data

Aug. 25, 2009 (JP) ................................. 2009-194390

(51) Int. Cl.
*F16K 11/06* (2006.01)
(52) U.S. Cl. ................................. 137/625.43
(58) Field of Classification Search ............. 137/625.43; 62/324.6
See application file for complete search history.

(56) References Cited

U.S. PATENT DOCUMENTS

| | | | | |
|---|---|---|---|---|
| 2,855,000 | A * | 10/1958 | Van Allen et al. ....... | 137/625.43 |
| 4,139,355 | A * | 2/1979 | Turner et al. .............. | 62/324.6 |
| 5,690,144 | A * | 11/1997 | Takahashi ................ | 137/625.43 |
| 5,755,111 | A * | 5/1998 | Toyama .................... | 62/324.6 |
| 6,076,365 | A * | 6/2000 | Benatav ..................... | 62/160 |
| 6,234,207 | B1 * | 5/2001 | Toyama .................... | 137/625.43 |
| 7,036,521 | B2 * | 5/2006 | Hager ....................... | 137/309 |
| 2001/0013369 | A1 | 8/2001 | Sasada et al. | |

FOREIGN PATENT DOCUMENTS

JP    2001-295951    10/2001

* cited by examiner

*Primary Examiner* — John Fox
(74) *Attorney, Agent, or Firm* — Stites & Harbison, PLLC; Juan Carlos A. Marquez, Esq.

(57) ABSTRACT

There is provided a multi-way selector valve capable of suppressing any excessive rise in the pressure of a high-pressure refrigerant during a transitional phase of flow path switching and of preventing malfunctioning of a flow path switching operation, while also being capable of preventing situations in which erroneous judgments of anomaly/failure occurrences in the device are made by a fail-safe mechanism to cause the device to stop unduly. A high-pressure passage portion 55 to which a high-pressure fluid is introduced is formed in a valve member 50. A valve seat portion 65 provided with a first inlet/outlet 13 and a second inlet/outlet 14 that are selectively communicated with an outlet-side end portion 55a of the high-pressure passage portion 55, and a valve chest 61 into which a low-pressure fluid is selectively introduced via the first inlet/outlet 13 and the second inlet/outlet 14 are provided in a valve body 60. During the transitional phase of flow path switching, the outlet-side end portion 55a of the high-pressure passage portion 55 of the valve member 50 is made to slide while being pressed against a portion between the first inlet/outlet 13 and the second inlet/outlet 14 in the valve seat portion 65. There is formed between the first inlet/outlet 13 and the second inlet/outlet 14 of the valve seat portion 65 an escape passage portion 69 comprising a groove, notch, through-hole or the like for allowing the high-pressure refrigerant of the high-pressure passage portion 55 to escape to the side of the valve chest 61 during the transitional phase of flow path switching.

5 Claims, 6 Drawing Sheets

<Article of present invention>

<Conventional article>

(A) During cooling operation (B) During heating operation

MULTI-WAY SELECTOR VALVE

BACKGROUND OF THE INVENTION

1. Field of the Invention

The present invention relates to multi-way selector valves such as three-way selector valves, four-way selector valves, and the like that are used in refrigeration cycles and the like, and more particularly to rotary multi-way selector valves that switch flow paths by rotating a valve member with an actuator, such as a motor comprising a rotor and a stator, or the like.

2. Background Art

In general, refrigeration cycles of air-conditioners, refrigerators and the like comprise a compressor, a gas-liquid separator, a condenser (outdoor heat exchanger), an evaporator (indoor heat exchanger), an expansion valve, and the like, as well as a four-way selector valve as a flow path (flow direction) selector means.

An example of such a refrigeration cycle comprising a four-way selector valve will be described with reference to FIG. 5 and FIG. 6. A refrigeration cycle 300 in the illustrated example is for an air-conditioner and performs the switching of operation modes (cooling operation and heating operation) with a four-way selector valve 320. Specifically, it comprises a compressor 310, a gas-liquid separator 312, a condenser (outdoor heat exchanger) 314, an evaporator (indoor heat exchanger) 316, and an expansion valve 318. Amid the above-mentioned four units, namely, the compressor 310, the gas-liquid separator 312, the condenser 314, and the evaporator 316, there is disposed the four-way selector valve 320, which has four ports (inlets/outlets), namely, first to fourth ports a, b, c, and d (see FIG. 6).

Each of the units mentioned above are interconnected with flow paths formed by conduits (pipes) and the like. Specifically, there are provided: an inlet flow path 321 that routes the refrigerant inside the gas-liquid separator 312 to the compressor 310; a discharge flow path 322 that routes the high-pressure refrigerant discharged from the compressor 310 to the first port a of the four-way selector valve 320; a condenser-side feed/return flow path 323 that connects the second port b of the four-way selector valve 320 and a first throughlet 314a of the condenser 314; an evaporator-side feed/return flow path 324 that connects the third port c of the four-way selector valve 320 and a first throughlet 316a of the evaporator 316; a return flow path 325 that connects the fourth port d of the four-way selector valve 320 and a return port 312a of the gas-liquid separator 312; a flow path 326 that connects a second throughlet 314b of the condenser 314 and the expansion valve 318; and a flow path 327 that connects the expansion valve 318 and a second throughlet 316b of the evaporator 316.

With the refrigeration cycle 300 of such a configuration, when the cooling operation mode is selected, the four-way selector valve 320 is switched to a state that communicates the discharge flow path 322 with the condenser-side feed/return flow path 323, while at the same time communicating the evaporator-side feed/return flow path 324 with the return flow path 325 as shown in FIG. 6(A). In this case, as indicated with the solid arrows in FIG. 5, the low-pressure refrigerant within the gas-liquid separator 312 enters the compressor 310 via the inlet flow path 321, while a high-temperature high-pressure refrigerant is routed from a discharge port 310a of the compressor 310 to the condenser 314 via the discharge flow path 322, the four-way selector valve 320 and the condenser-side feed/return flow path 323, exchanges heat with the outdoor air and is condensed at the condenser 314 to become a high-pressure two-phase refrigerant, and is introduced to the expansion valve 318 via the flow path 326. The pressure of the high-pressure refrigerant is reduced by this expansion valve 318, and the low-pressure refrigerant whose pressure has been reduced is introduced into the evaporator 316 via the flow path 327, exchanges heat with the indoor air (cooling) here and evaporates. From the evaporator 316, a low-temperature low-pressure refrigerant is returned to the gas-liquid separator 312 via the evaporator-side feed/return flow path 324, the four-way selector valve 320, and the return flow path 325.

In contrast, when the heating operation mode is selected, the four-way selector valve 320 is switched to a state that communicates the discharge flow path 322 with the evaporator-side feed/return flow path 324, while at the same time communicating the condenser-side feed/return flow path 323 with the return flow path 325 as shown in FIG. 6(B). In this case, as indicated with the dashed arrows in FIG. 5, the refrigerant within the gas-liquid separator 312 enters the compressor 310 via the inlet flow path 321, while a high-temperature high-pressure refrigerant is routed from the discharge port 310a of the compressor 310 to the evaporator 316 via the discharge flow path 322, the four-way selector valve 320 and the evaporator-side feed/return flow path 324, exchanges heat with the indoor air (heating) and evaporates at the evaporator 316 to become a high-pressure two-phase refrigerant, and is introduced to the expansion valve 318 via the flow path 327. The pressure of the high-pressure refrigerant is reduced by this expansion valve 318, and the low-pressure refrigerant whose pressure has been reduced is introduced into the condenser 314 via the flow path 326, exchanges heat with the outdoor air here and condenses. From the condenser 314, a low-temperature low-pressure refrigerant is returned to the gas-liquid separator 312 via the condenser-side feed/return flow path 323, the four-way selector valve 320, and the return flow path 325.

A rotary four-way selector valve that is incorporated into a refrigeration cycle such as that mentioned above basically comprises, as can be seen in Patent Document 1 indicated below: a valve member that is rotated by an actuator such as a motor or the like; and a valve body that rotatably holds the valve member and has a valve seat portion and a valve chest, wherein a first inlet/outlet (condenser communicating port), a second inlet/outlet (evaporator communicating port), a high-pressure inlet for introducing a high-pressure refrigerant from the compressor discharge side into the valve chest, and a low-pressure outlet for venting the low-pressure refrigerant to the compressor inlet side are provided in the valve seat portion of this valve body, and the switching of flow paths is performed by selectively communicating, by rotating the valve member, one of the first inlet/outlet and the second inlet/outlet with one of the high-pressure inlet (valve chest) and the low-pressure outlet by means of a passage portion provided within the valve member.

However, a conventional rotary four-way selector valve such as that described above had problems in that the pressure difference between the inside and the outside of the valve member becomes extremely large due to the fact that a high-pressure refrigerant is introduced into the valve chest while a low-pressure refrigerant is made to flow through the passage portion within the valve member, and the valve member is pressed strongly against the valve seat portion due to that pressure difference (the high-pressure refrigerant), resulting in a tendency for the valve member to not rotate smoothly at the time of flow path switching, thereby making the flow path switching operation heavy, and in that the valve member and the valve seat portion are prone to wear.

In order to solve such problems, the present inventors had previously proposed a four-way selector valve of such a configuration as follows (Patent Document 2 indicated below).

Specifically, as shown in FIG. 3 and FIG. 4, this previously-proposed four-way selector valve 1' comprises: a valve member 50 that is rotated by an actuator 15 such as a motor or the like so as to switch flow paths; and a valve body 60 that rotatably holds this valve member 50, wherein a high-pressure passage portion 55 to which a high-pressure refrigerant is introduced is formed in the valve member 50, the valve body 60 is provided with a valve seat portion 65 that has a first inlet/outlet 13 and a second inlet/outlet 14 that are selectively communicated with the outlet side of the high-pressure passage portion 55, and a valve chest 61 into which a low-pressure refrigerant is selectively introduced via the first inlet/outlet 13 and the second inlet/outlet 14, an outlet-side end portion of the high-pressure passage portion 55 of the valve member 50 is made to slide between the first inlet/outlet 13 and the second inlet/outlet 14 in the valve seat portion 65 at the time of flow path switching, and the shapes and dimensions of the valve member 50 and the like (namely, the outer diameter of a lower end portion 54 of an inverted L-shaped shaft portion 53, the effective inner diameter of a square ring 75, and the like) are set in such a manner that the force in the direction in which the valve member 50 is pressed against the valve seat portion 65 by the high-pressure refrigerant is substantially canceled.

More specifically, the valve member 50 has the inverted L-shaped shaft portion 53, and the crank shaped or inverted L-shaped high-pressure passage portion 55 for selectively routing the high-pressure refrigerant to the first inlet/outlet 13 and the second inlet/outlet 14 is formed within the inverted L-shaped shaft portion 53. In addition, a high-pressure inlet 11 for routing the high-pressure fluid to the high-pressure passage portion 55 of the valve member 50 is provided in a bottom portion of the valve chest 61 on the side opposite the valve seat portion 65. Further, a low-pressure outlet 12 that opens to the valve chest 61 is provided. It is thus made to function as a four-way selector valve used in the above-mentioned refrigeration cycle.

In this proposed four-Way selector valve 1', the high-pressure passage portion 55 to which the high-pressure refrigerant is introduced is formed within the valve member 50, while at the same time an arrangement is made such that the low-pressure refrigerant is introduced into the valve chest 61, and the shapes and dimensions of the valve member 50 and the like are so set as to substantially cancel the force in the direction in which the valve member 50 is pressed against the valve seat portion 65 by the high-pressure refrigerant. Thus, flow path switching operations can be performed with ease, while at the same time the valve member 50 and the valve seat portion 65 become less prone to wear and, consequently, durability and reliability are improved.

[Patent Document 1] JP Patent Publication (Kokai) No. 2001-295951 A

[Patent Document 2] JP Patent Application No. 2009-098188

SUMMARY OF THE INVENTION

However, with the conventional rotary four-way selector valve 1' described above, the switching of flow paths, that is, the switching between, for example, a cooling operation state, in which the first inlet/outlet 13 is communicated with the high-pressure passage portion 55 while the second inlet/outlet 14 is communicated with the low-pressure outlet 12, and, for example, a heating operation state, in which the second inlet/outlet 14 is communicated with the high-pressure passage portion 55 while the first inlet/outlet 13 is communicated with the low-pressure outlet 12, is performed by rotating the valve member 50 from the position shown in FIG. 4(A) (hereinafter, the first operating position) to the position shown in FIG. 4(D) (hereinafter, the second operating position) or by rotating it in the reverse direction.

In this case, during a transitional phase in flow path switching (i.e., in the middle of switching from the first operating position to the second operating position or from the second operating position to the first operating position), an outlet-side end portion 55a (square ring 75) of the high-pressure passage portion 55 of the valve member 50 slides while being pressed against a portion between the first inlet/outlet 13 and the second inlet/outlet 14 in the valve seat portion 65 as shown in FIGS. 4(B) and (C). Thus, the outlet side of the high-pressure passage portion 55 is closed by the valve seat portion 65.

When the outlet side of the high-pressure passage portion 55 is thus closed during the transitional phase in flow path switching, the high-pressure refrigerant on the compressor discharge side is left with no escape, albeit for a very short time, and the pressure, of the high-pressure refrigerant rises sharply, thereby possibly giving rise to such problems as malfunctioning of the flow path switching operation, erroneous judgments of anomaly/failure occurrences in the device by a fail-safe mechanism causing the device to stop unduly, and the like.

The present invention is made in view of such circumstances, and one object thereof is to provide a multi-way selector valve that is capable of suppressing an excessive rise in the pressure of the high-pressure refrigerant during the transitional phase of flow path switching to ensure that no malfunctioning of the flow path switching operation is caused, and that is capable of preventing occurrences of a situation where an anomaly/failure in the device is erroneously judged by a fail-safe mechanism, causing the device to stop unduly.

In order to achieve the object mentioned above, a multi-way selector valve according to the present invention basically comprises: a valve member that is rotated by an actuator such as a motor or the like to switch flow paths; and a valve body that rotatably holds the valve member, wherein a high-pressure passage portion to which a high-pressure fluid is introduced is formed within the valve member, the valve body comprises a valve seat portion, which is provided with a first inlet/outlet and a second inlet/outlet that are selectively communicated with an outlet side of the high-pressure passage portion, and a valve chest, into which a low-pressure fluid is selectively introduced via the first inlet/outlet and the second inlet/outlet, an outlet-side end portion of the high-pressure passage portion of the valve member is, during a transitional phase of flow path switching, adapted to slide while being pressed against a portion between the first inlet/outlet and the second inlet/outlet in the valve seat portion, and an escape passage portion comprising a groove, notch, through hole or the like for allowing the high-pressure refrigerant of the high-pressure passage portion to escape to the side of the valve chest during the transitional phase of flow path switching is formed in the valve seat portion.

The valve member preferably comprises an inverted L-shaped shaft portion, wherein the high-pressure passage portion of an inverted L-shape or crank-shape for selectively routing the high-pressure refrigerant to the first inlet/outlet and the second inlet/outlet is formed within the inverted L-shaped shaft portion.

The escape passage portion is preferably formed between the first inlet/outlet and the second inlet/outlet and in the shape of, as viewed planarly, an ellipse, an oval, a magatama (curved bead), a hango (Japanese-style camping pot) or the like, so as to partially overlap with the outlet-side end portion of the high-pressure passage portion.

In another preferred embodiment, a valve seat portion in which the first inlet/outlet and the second inlet/outlet are formed is provided in the valve chest on the side of the actuator, and a high-pressure inlet for routing a high-pressure fluid to the high-pressure passage portion of the valve member is formed in a bottom portion of the valve, chest on the side opposite the actuator.

Yet another preferred embodiment is adapted such that a low-pressure outlet that opens to the valve chest is formed, and such that it functions as a four-way selector valve.

In a multi-way selector valve according to the present invention, since the escape passage portion comprising the groove, notch, through hole or the like is formed between the first inlet/outlet and the second inlet/outlet in the valve seat portion, the escape passage portion and the outlet-side end portion of the high-pressure passage portion partially overlap with each other in the transitional phase of flow path switching, and the high-pressure refrigerant on the compressor discharge side is allowed to escape to the valve chest from the high-pressure passage portion via the escape passage portion. Thus, it is possible to suppress any excessive rise in the pressure of the high-pressure refrigerant during the transitional phase in flow path switching, as a result of which malfunctioning of the flow path switching operation is prevented, while at the same time a situation in which anomaly/failure occurrences in the device are erroneously judged by a fail-safe mechanism to cause the device to stop unduly is prevented.

DESCRIPTION OF SYMBOLS

Figure 1:
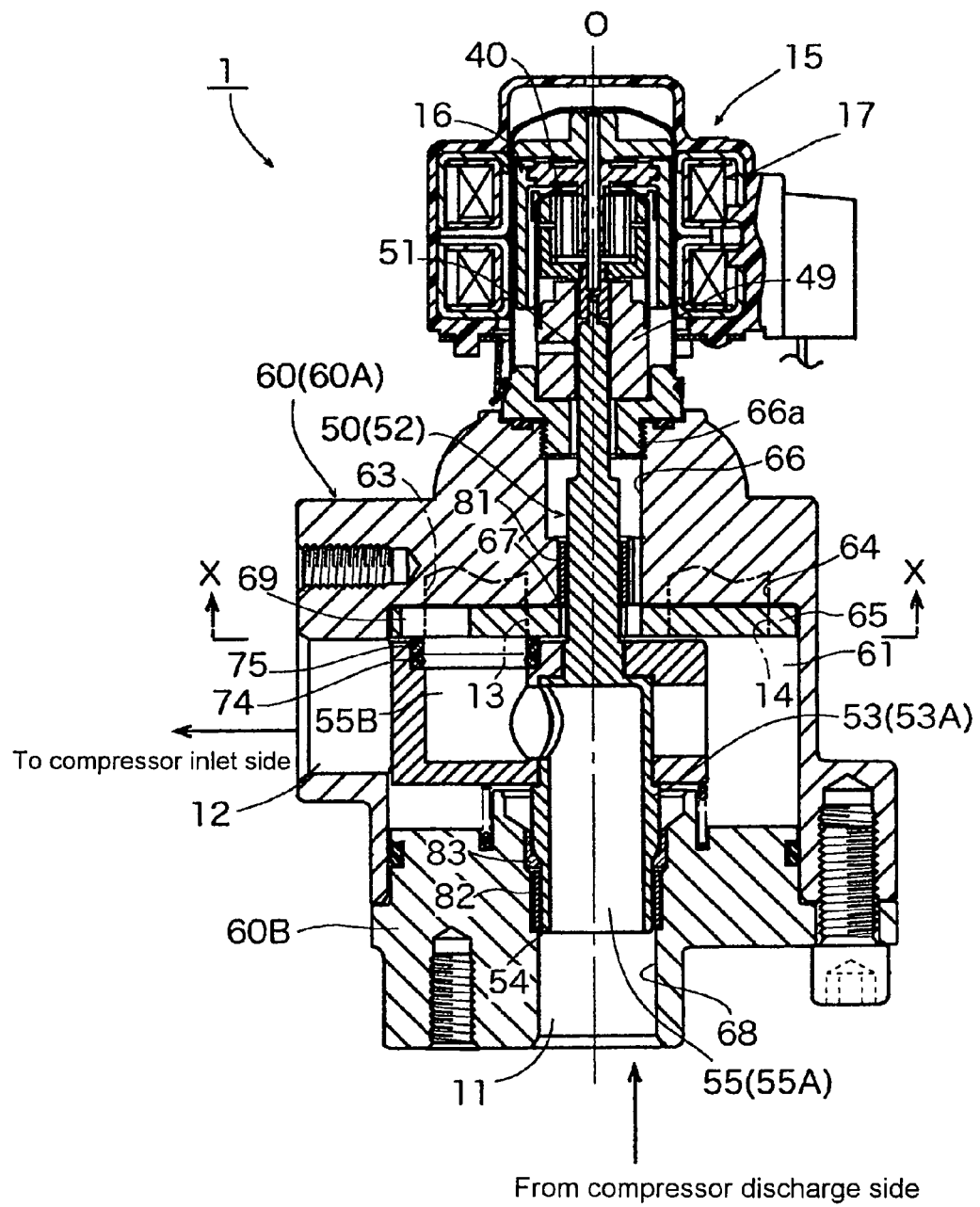
FIG. 1 is a vertical sectional view showing an embodiment of a multi-way (four-way) selector valve according to the present invention.

1 Four-way selector valve
11 High-pressure inlet
12 Low-pressure outlet
13 First inlet/outlet
14 Second inlet/outlet
15 Motor (actuator)
16 Rotor
17 Stator
50 Valve member
55 High-pressure passage portion
60 Valve body
61 Valve chest
65 Valve seat portion
69 Escape passage portion

DETAILED DESCRIPTION OF THE PREFERRED EMBODIMENTS

Embodiments of four-way selector valves according to the present invention are described below with reference to the drawings.

Figure 3:
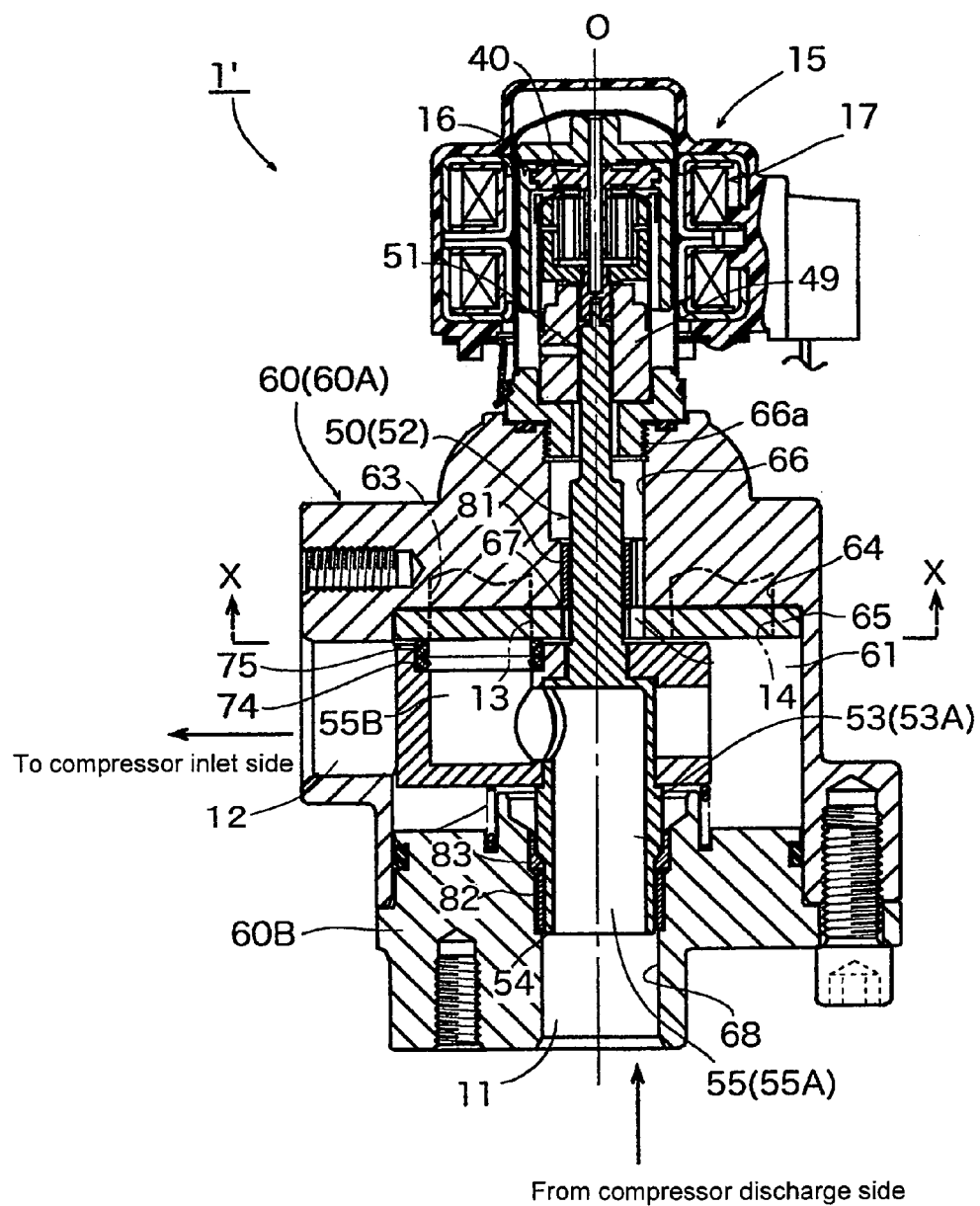
FIG. 3 is a vertical sectional view showing an example of a conventional multi-way (four-way) selector valve.

FIG. 1 is a vertical sectional view showing an embodiment of a multi-way (four-way) selector valve according to the present invention. With respect to a four-way selector valve 1 of the present embodiment, like parts to those of the previously discussed conventional four-way selector valve 1' shown in FIG. 3 are denoted with like reference numerals.

The four-way selector valve 1 in the illustrated example is also used in refrigeration cycles of car air-conditioners and the like, and comprises: a valve member 50 that is rotated by a motor 15 as an actuator comprising a rotor 16 and a stator 17; and a valve body 60 that rotatably holds this valve member 50.

In the four-way selector valve 1 of the present embodiment, an epicyclic gear decelerating mechanism 40 is mounted between the rotor 16 of the motor 15 and the valve member 50, and the rotation of the rotor 16 is transmitted to the valve member 50 after being significantly decelerated. For details of the configuration of the epicyclic gear decelerating mechanism 40, see, for example and if necessary, JP Patent Publication (Kokai) No. 2008-101765 A by the applicant of the present invention, or the like.

A valve seat portion 65 in which a first inlet/outlet 13 and a second inlet/outlet 14 are formed with an appropriate angular interval therebetween is fitted with and affixed to an upper split body 60A of the valve body 60 located on the side of the motor 15, and a vale chest 61 is also formed in the upper split body 60A. A high-pressure inlet 11 is provided in the center of the bottom portion (along rotation axis O) of a lower split body 60B that is located below the upper split body 60A of the valve body 60. There are formed in the upper split body 60A: an inverted L-shaped passage portion 63 having a first connecting port (joint) 63a that opens to a peripheral side portion that communicates with the first inlet/outlet 13; and an inverted L-shaped passage portion 64 having a second connecting port (joint) 64a that opens to a peripheral side portion that communicates with the second inlet/outlet 14.

The valve member 50 comprises, in order from the top: a small diameter shaft portion 51 that is linked with the epicyclic gear decelerating mechanism 40 within the motor 15; a center shaft portion 52; and an inverted L-shaped shaft portion 53. Within the inverted L-shaped shaft portion 53, there is formed an inverted L-shaped or a crank-shaped high-pressure passage portion 55 for selectively routing the high-pressure refrigerant from the high-pressure inlet 11 to the first inlet/outlet 13 and the second inlet/outlet 14. The high-pressure passage portion 55 comprises: a lower passage portion 55A on the side of the high-pressure inlet 11; and an upper passage portion 55B on the side of the valve seat portion 65 (i.e., on the side of the first inlet/outlet 13 and the second inlet/outlet 14). An O-ring 74 and a square ring 75 (described later) as seal members are fitted at an outlet-side end portion 55a of the upper passage portion 55B.

The small diameter shaft portion 51 of the valve member 50 is rotatably fitted and inserted into a thick-walled cylindrical guide portion 49 provided on the side of the motor 15. The center shaft portion 52 is rotatably fitted and inserted into insertion holes 66, 67 formed in the center (along rotation axis O) of the upper split body 60A and the valve seat portion 65. The lower end portion of the inverted L-shaped shaft portion 53 is rotatably inserted into an insertion hole 68 that is continuously provided above the high-pressure inlet 11 in the center of the bottom portion.

In addition, the O-ring 74 and the square ring 75 as seal members are fitted in an inner circumferential groove (recessed portion) in the end portion 55a on the side of the valve seat portion 65 (i.e., the end portion on the outlet side) of the high-pressure passage portion 55. Here, the O-ring 74 is pushed in a radially outward direction by the high-pressure refrigerant of the high-pressure passage portion 55, and its cross-section changes from a circular shape to an elliptical shape. The configuration is such that one end face of the square ring 75 is pressed against the valve seat portion 65 using this change in shape of the O-ring 74 to attain sealing effects. Further, O-rings as seal members are fitted between the valve seat portion 65 and the upper split body 60A.

Further, in the four-way selector valve 1 of the present embodiment, sleeve-shaped bearing members 81, 82 that slidably and rotatably support the valve member 50 are respectively provided at two places, namely, in the upper and lower parts of the valve body 60, while a seal member 83 is fitted between a vertical side portion 53A of the valve member 50 and the insertion hole 68 in the valve body 60.

Figure 2:
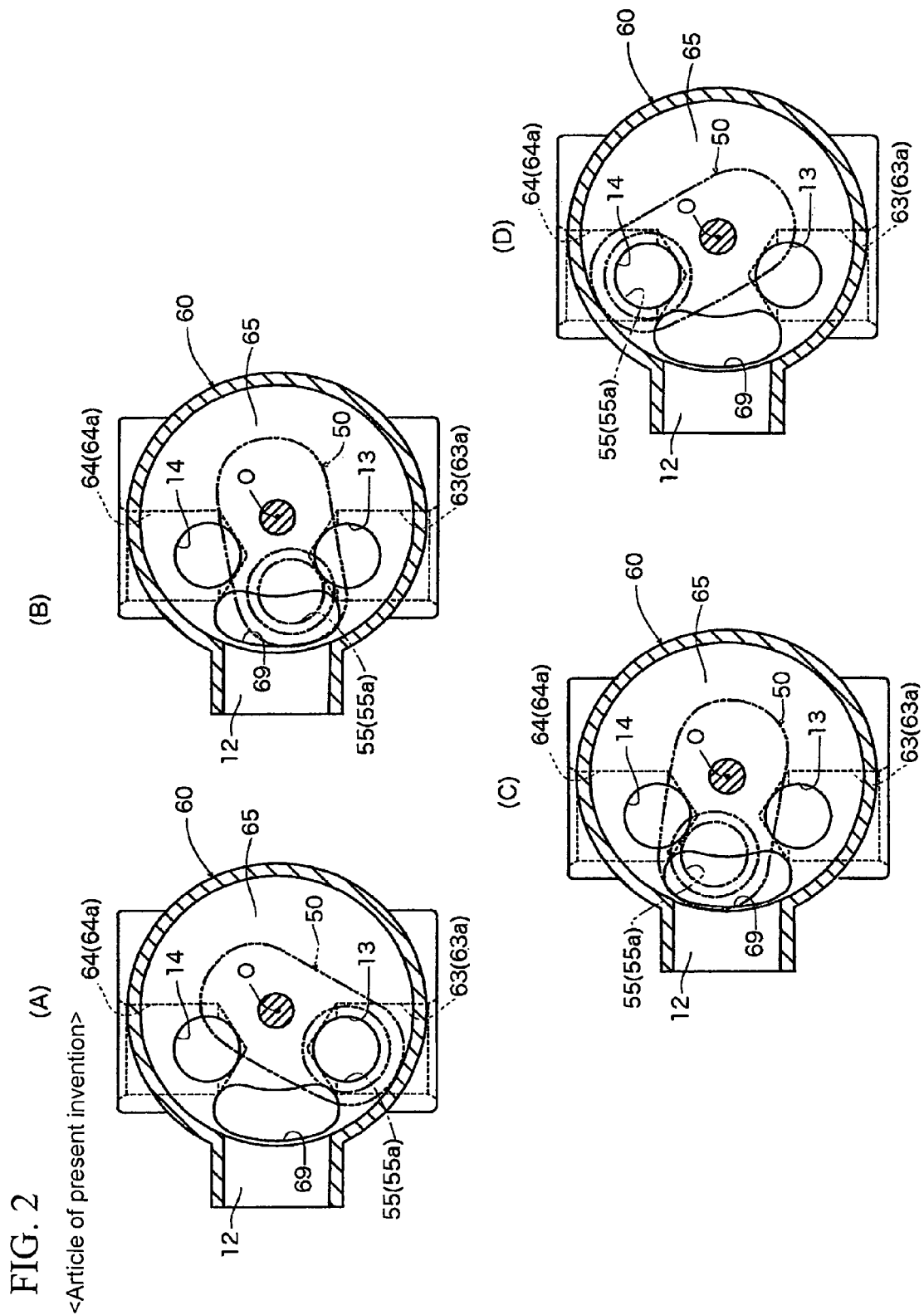
FIG. 2 is a sectional view taken along arrows X-X in FIG. 1.

With the four-way selector valve 1 of such a configuration, the switching of flow paths, that is, the switching between, for example, a cooling operation state in which the first inlet/outlet 13 is communicated with the high-pressure passage portion 55 while the second inlet/outlet 14 is communicated with the low-pressure outlet 12 and, for example, a heating operation state in which the second inlet/outlet 14 is communicated with the high-pressure passage portion 55 while the first inlet/outlet 13 is communicated with the low-pressure outlet 12, is performed by rotating the valve member 50 from the position shown in FIG. 2(A) (the first operating position) to the position shown in FIG. 2(D) (the second operating position) or by rotating it in the reverse direction.

In this case, during the transitional phase in flow path switching (i.e., in the middle of switching from the first operating position to the second operating position or from the second operating position to the first operating position), the outlet-side end portion 55a (the square ring 75) of the high-pressure passage portion 55 of the valve member 50 slides while being pressed against the portion between the first inlet/outlet 13 and the second inlet/outlet 14 in the valve seat portion 65 as shown in FIGS. 2(B) and (C).

Figure 4:
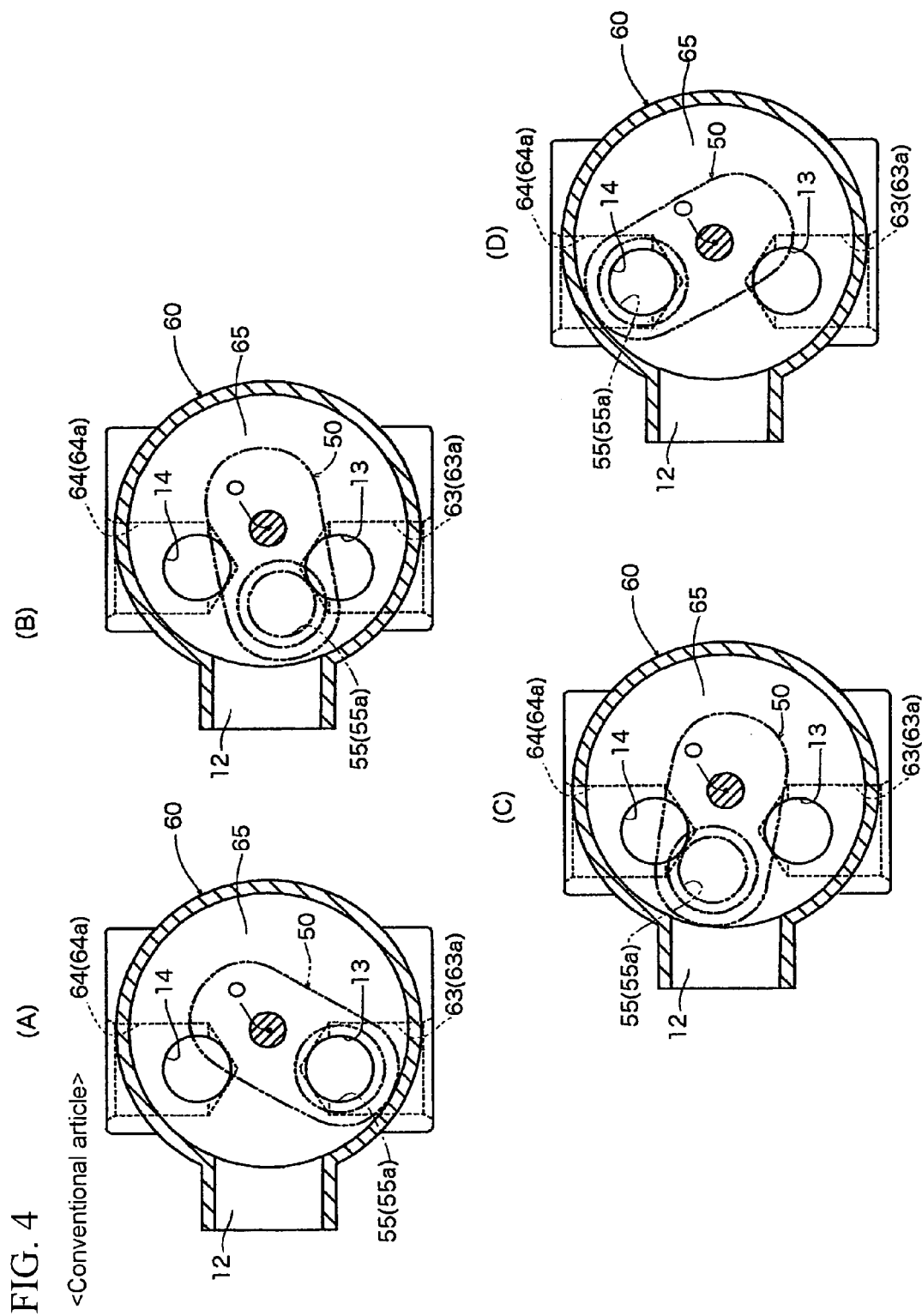
FIG. 4 is a sectional view taken along arrows X-X in FIG. 3.
Figure 5:
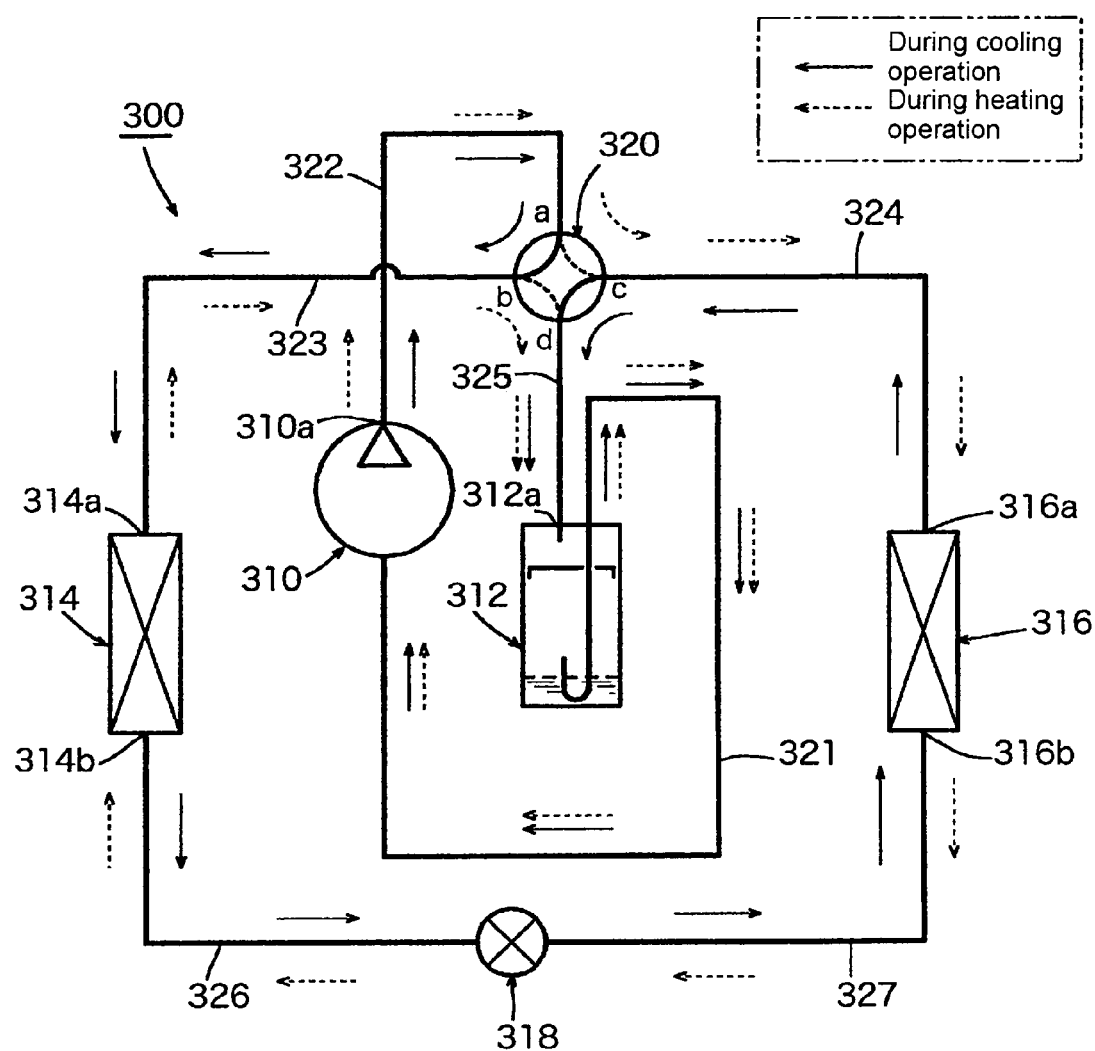
FIG. 5 is a diagram showing an example of a refrigeration cycle in which a four-way selector valve is used.
Figure 6:
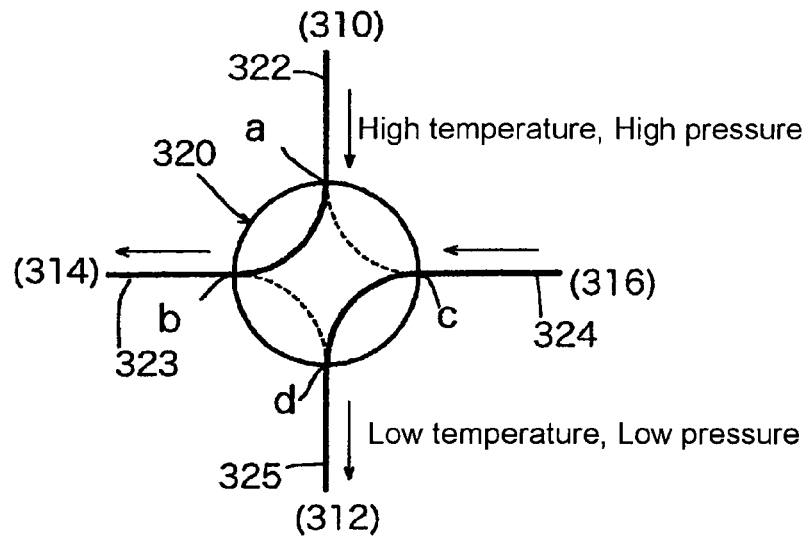
FIG. 6 is a diagram for illustrating the operations of the four-way selector valve shown in FIG. 5.
Figure 6:
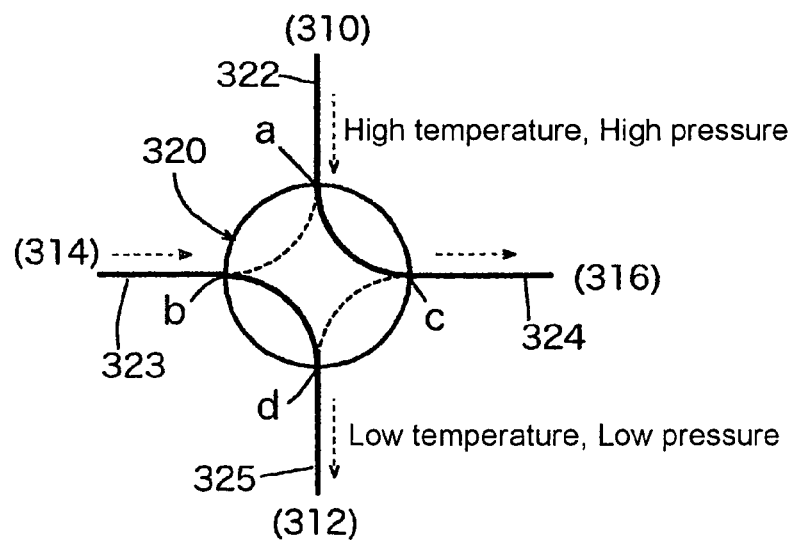

Here, with the above-discussed conventional four-way selector valve 1' shown in FIG. 3 and FIG. 4, the outlet side of the high-pressure passage portion 55 is closed by the valve seat portion 65 during the transitional phase of flow path switching, the high-pressure refrigerant on the compressor discharge side is left with no escape, and the pressure of the high-pressure refrigerant rises sharply, thereby possibly giving rise to such problems as malfunctioning of the flow path switching operation, erroneous judgments of anomaly/failure occurrences in the device by a fail-safe mechanism causing the device to stop unduly, and the like. However, with the four-way selector valve 1 of the present example, the problems above are overcome in the following manner.

Specifically, there is formed between the first inlet/outlet 13 and the second inlet/outlet 14 in the valve seat portion 65 an escape passage portion 69 comprising a slot for allowing the high-pressure refrigerant of the high-pressure passage portion 55 to escape to the side of the valve chest 61 during the transitional phase of flow path switching. This escape passage portion 69 is arranged in the shape of, as viewed planarly, a hango (Japanese-style camping pot) or the like, both of whose ends are semicircular and whose inner circumferential side and outer circumferential side are concentric arcs, so as to partially overlap with the outlet-side end portion 55a of the high-pressure passage portion 55.

By thus, having the escape passage portion 69 comprising the slot be formed between the first inlet/outlet 13 and the second inlet/outlet 14 in the valve seat portion 65, the escape passage portion 69 and the outlet-side end portion 55a of the high-pressure passage portion 55 partially overlap with each other during the transitional phase of flow path switching as shown in FIGS. 2(B) and (C), and the high-pressure refrigerant on the compressor discharge side is allowed to escape to the valve chest 61 from the high-pressure passage portion 55 via the escape passage portion 69. Thus, it is possible to suppress any excessive rise in the pressure of the high-pressure refrigerant during the transitional phase of flow path switching. Consequently, it is possible to prevent malfunctioning of the flow path switching operation, while at the same time preventing situations in which erroneous judgments of anomaly/failure occurrences in the device are made by a fail-safe mechanism causing the device to stop unduly.

It is noted that since the refrigerant that has been allowed to escape to the valve chest 61 from the high-pressure passage portion 55 is returned to the compressor inlet side via the low-pressure outlet 12 and the like, it would cause no harm to the operation of an air-conditioning device (car air-conditioner) at all. In addition, when the valve member 50 is in the first operating position shown in FIG. 2(A), or in the second operating position shown in FIG. 2(D), the escape passage portion 69 and the outlet-side end portion 55a of the high-pressure passage portion 55 do not overlap with each other at all. Thus, the high-pressure refrigerant would never leak into the valve chest 61.

In the embodiment above, a case has been described where the present invention is applied to a four-way selector valve, which is one kind of multi-way selector valve. However, besides a four-way selector valve, the present invention is similarly applicable to, for example, a three-way selector valve without the low-pressure outlet 12, or the like.

What is claimed is:

1. A multi-way selector valve, comprising:
    a valve member that is rotated by an actuator such as a motor or the like in order to switch flow paths; and
    a valve body that rotatably holds the valve member, wherein
    a high-pressure passage portion to which a high-pressure fluid is introduced is formed in the valve member,
    a valve seat portion provided with a first inlet/outlet and a second inlet/outlet that are selectively communicated with an outlet side of the high-pressure passage portion, and a valve chest into which a low-pressure fluid is selectively introduced via the first inlet/outlet and the second inlet/outlet are provided in the valve body,
    during a transitional phase of flow path switching, an outlet-side end portion of the high-pressure passage portion of the valve member slides while being pressed against a portion between the first inlet/outlet and the second inlet/outlet in the valve seat portion, and
    an escape passage portion comprising a groove, notch, through-hole or the like for allowing a high-pressure refrigerant of the high-pressure passage portion to escape to the side of the valve chest during the transitional phase of flow path switching is formed in the valve seat portion.

2. The multi-way selector valve according to claim 1, wherein the valve member comprises an inverted L-shaped shaft portion, and the high-pressure passage portion of an inverted L shape or a crank shape for selectively routing the high-pressure refrigerant to the first inlet/outlet and the second inlet/outlet is formed within the inverted L-shaped shaft portion.

3. The multi-way selector valve according to claim 1, wherein the escape passage portion is formed between the first inlet/outlet and the second inlet/outlet, and is in the shape of, as viewed planarly, an ellipse, an oval, a magatama (curved bead), a hango (Japanese-style camping pot) or the like, so as to partially overlap with the outlet-side end portion of the high-pressure passage portion.

4. The multi-way selector valve according to claim 1, wherein the valve seat portion in which the first inlet/outlet and the second inlet/outlet are formed is provided in the valve chest on the side of the actuator, and a high-pressure inlet for routing the high-pressure fluid to the high-pressure passage portion of the valve member is formed in a bottom portion of the valve chest on a side opposite the actuator.

5. The multi-way selector valve according to claim 1, wherein a low-pressure outlet that opens to the valve chest is formed, and the multi-way selector valve is adapted to function as a four-way selector valve.

* * * * *